United States Patent [19]

Nakamura et al.

[11] 4,404,347
[45] Sep. 13, 1983

[54] POLYISOCYANATE CROSS-LINKED POLYMERS CONTAINING CELLULOSIC COMPONENT

[75] Inventors: Toshiomi Nakamura, Daito; Masakazu Okamura, Suita; Yoichiro Moriguchi, Hirakata; Tamiki Hayase, Osaka, all of Japan

[73] Assignee: Nippon Paint Co., Ltd., Osaka, Japan

[21] Appl. No.: 335,476

[22] Filed: Dec. 29, 1981

[30] Foreign Application Priority Data

Jan. 9, 1981 [JP] Japan .................................. 56-2268

[51] Int. Cl.³ ...................... C08G 18/06; C08G 18/28; C08L 1/10
[52] U.S. Cl. ................................. 527/300; 527/301; 527/311
[58] Field of Search ............... 527/300, 301, 311, 312, 527/313, 314, 315

[56] References Cited

U.S. PATENT DOCUMENTS 3,475,356 10/1969 Davis et al. .......................... 527/301
4,251,404 2/1981 Simms ................................. 527/301

FOREIGN PATENT DOCUMENTS 50-48091 4/1975 Japan ................................. 527/301

Primary Examiner—John Kight, III
Assistant Examiner—Nathan M. Nutter
Attorney, Agent, or Firm—Millen & White

[57] ABSTRACT

Cellulose derivatives such as cellulose nitrate, cellulose acetate, cellulose acetate butyrate or ethyl cellulose may be cross-linked with a synthetic film-forming resin such as acrylic resin, alkyd resin, epoxy resin, aminoplast resin or mixtures of these resins by first reacting said cellulose derivative with a polyisocyanate compound to give an addition-reaction product containing free isocyanate groups, then reacting the resulting product with said film-forming resin. The resulting cross-linked hybrid polymers exhibit remarkably advantageous properties as a film-forming component for use in lacquer type coating compositions.

23 Claims, No Drawings

POLYISOCYANATE CROSS-LINKED POLYMERS CONTAINING CELLULOSIC COMPONENT

BACKGROUND OF THE INVENTION

Lacquer compositions comprising cellulose derivatives have long been used to finish many products such as automobiles, furnitures and the like. Because of limited solubilities of the cellulose derivatives used, the lacquer compositions for spray coating generally have a relatively low solid content and contain large amounts of ketone type or ester type solvents having strong dissolving power. Accordingly, these compositions tend to give poor appearance and brilliance in the finished coating and often cause underlying coatings to be dissolved, swollen or lifted when layered thereupon.

Because of limited mutual solubilities, cellulosic lacquer compositions may not be blended with other film forming polymers such as acrylics, alkyds or polyesters in a desirable manner to adapt the compositions for various uses. To this end, Japanese Patent Publication No. 5659/1976 discloses a graft polymer between cellulose acetate butyrate and acrylic polymer. Experiments have shown, however, that this graft polymer does not fully dissolve the above-mentioned problems.

Therefore, it is an object of the present invention to provide a new polymer for use in the preparation of lacquer compositions which may obviate the disadvantages of existing cellulosic lacquer compositions while retaining the advantages thereof.

It is another object the present invention to provide a method for synthesizing said polymer.

Other objects and advantages of the present invention will be apparent as the description proceeds.

DESCRIPTION OF THE INVENTION

According to the present invention, there is provided a cross-linked hybrid polymer comprising a first polymer block and a second polymer block being cross-linked together by a polyisocyanate at different reaction sites of said polyisocyanate, said first polymer block being a film-forming cellulose derivative having at least one active hydrogen atom, said second polymer block having at least one active hydrogen atom and being a film-forming polymer selected from the group consisting of an acrylic resin, an alkyd resin, a polyester resin, an epoxy resin, an aminoplast resin and a mixture of these resins.

The cross-linked hydrid polymer may be synthesized by first reacting (A) a polyisocyanate with (B) a film-forming cellulose derivative having at least one active hydrogen atom selectively through one isocyanate group, and then with (C) a film-forming polymer having at least one active hydrogen atom selected from the group consisting of an acrylic resin, an alkyd resin, a polyester resin, an epoxy resin, an aminoplast resin and a mixture of these resins through the remaining isocyanate group or groups.

Preferably, the ratio of the active hydrogen equivalent of said cellulose derivative (B) to the isocyanate equivalent of said polyisocyanate ranges from 0.5 to 200, preferably from 1 to 50, and the ratio of the isocyanate equivalent of said polyisocyanate (A) to the active hydrogen equivalent of said polymer (C) is generally less than 1.0, preferably less than 0.2.

Cellulose derivatives generally have a certain number of hydroxyl groups capable of reacting with an isocyanate group to form a urethane linkage.

Since their reaction rate is relatively low, it is possible to cause these hydroxyl groups to selectively react with the most reactive isocyanato group of a polyisocyanate compound if there exists a difference in the reactivity among various isocyanato groups. This selective reaction may be easily achieved by using an asymmetric isocyanate such as isophorone diisocyanate. However, symmetric isocyanates may also be used in this selective reaction. Once one isocyanate group has been reacted with the hydroxyl group, the reactivity of the remaining isocyanate group or groups will vary so that a similar reaction no longer takes place under a given reaction condition. If necessary, a catalyst may be used in this first reaction stage.

The second reaction stage according to the present invention may be easily carried out. Various active hydrogen-containing groups possessed by the above resins (C) have relatively higher reactivities than the hydroxyl groups possessed by said cellulose derivatives, and may be easily reacted with the remaining isocyanato groups in the intermediate reaction product.

The two stage reaction according to the present invention may be traced IR spectrophotometrically using the Lambert-Beer's law. Thus, the ratio of absorbance of NCO stretching vibration at 2240 cm$^{-1}$ to the absorbance of C—H stretching vibration at 2960 cm$^{-1}$ (Rt=$A_{NCO}/A_{CH}$) is measured during the reaction. Assuming the ratio of the unreacted mixture of reactants (A) and (B) to be 1.0, the first reaction stage may be continued until the ratio is 0.2 to 0.8, preferably 0.4 to 0.6. At this point the reaction component (C) is charged and the reaction is continued.

Assuming again the ratio of the unreacted mixture at the beginning of the second stage reaction, the reaction is allowed to proceed until the ratio lowers below 0.3, preferably below 0.1. Optimal reaction conditions would be such that said absorbance ratio decreases rapidly to about 0.5 and then becomes generally flat in the first reaction stage. The absorbance ratio usually decreases rapidly toward zero after charging the reaction component (C).

Examples of the cellulose derivatives (B) which may be used in the present invention include cellulose nitrate, cellulose acetate, cellulose acetate butyrate and the like. Cellulose nitrate and cellulose acetate butyrate are preferable.

Cellulose nitrate may be classified into various types depending upon its nitrogen content, wetting agent, shape and viscosity according to, for example, the classification of JIS K 6703. Among them, those having a nitrogen content from 11.5 to 12.2% and a viscosity from 1/16 to 20 seconds such as H 1/16, H ⅛, H ¼, H ½, H 2 and H 20 are preferable. Particularly, H 1/16, H ⅛, H ¼ and H ½ are preferable for the present invention because of their solubilities.

Cellulose acetate butyrate may also be classified into several types depending upon its degree of acetylation and the degree of butyrylation. Those having a degree of butyrylation greater than 30% are preferable because of their solubilities in conventional solvents. Suitable types of cellulose acetate butyrate are sold by Eastman Kodak Company, U.S.A. and include CAB-551-0.01, CAB-551-0.2, CAB-531-1, CAB-500-1, CAB-500-5, CAB-553-0.4, CAB-451-1, CAB-381-0.1, CAB-381-0.5, CAB-381-2, CAB-20 and the like.

Polyisocyanate compounds which may be used as the reaction component (A) in the present invention are well-known in the art and include, for example, aliphatic and alicyclic diisocyanates such as hexamethylene diisocyanate, 2,4-diisocyanate-1-methylcyclohexane, diisocyanatecyclobutane, tetramethylene diisocyanate, dicyclohexylmethane diisocyanate, dimethyldicyclohexylmethane diisocyanate, lysine alkyl ester diisocyanate, isophorone diisocyanate and the like; aromatic diisocyanates such as tolylene-2,4-diisocyanate, tolylene-2,6-diisocyanate, o-, m- or p-xylylene diisocyanate, diphenylmethane-4,4'-diisocyanate, 3-methyldiphenylmethane-4,4'-diisocyanate, m- or p-phenylene diisocyanate, chlorophenylene-2,4-diisocyanate, naphthalene-1,5-diisocyanate, diphenyl-4,4'-diisocyanate-3,3'-dimethyldiphenyl, 1,3,5-isopropylbenzene-2,4-diisocyanate, diphenylether diisocyanate and the like. Mixtures of these diisocyanates may also be used.

Urethane prepolymers produced by reacting a large excess of these diisocyanates with a polyol such as ethylene glycol, diethylene glycol, neopentyl glycol, trimethylolpropane, glycerol, hexanetriol and the like, polyisocyanates having an isocyanurate group, biuret group or allophanate group, and polyisocyanates derived from dimer acid may also be employed. Diisocyanate compounds such as isophorone diisocyanate or lysine alkyl ester diisocyanate are most preferable for the purpose of the present invention because their two isocyanate groups exhibit different reactivities from each other sufficient to achieve selective cross-linking reaction.

The reaction of polyisocyanates (A) with the aforementioned reaction components (B) and (C) may be catalyzed with conventional metallic catalysts such as dibutyltin dilaurate, dibutyltin dioctate and cobalt naphthate, or amines such as dimethylethanolamine, diethylethanolamine and the like.

Acrylic resins which may be used in the present invention are acrylic copolymers containing hydroxyl groups and are prepared by copolymerizing (a) at least one hydroxyl group-containing vinyl monomer with at least one other vinyl comonomer selected from the following groups (b) through (g).

(a) Hydroxyl group-containing monomers such as 2-hydroxyethyl acrylate, 2-hydroxyethyl methacrylate, 2-hydroxypropyl acrylate, 2-hydroxypropyl methacrylate, 1-methyl-2-hydroxyethyl acrylate, 1-methyl-2-hydroxyethyl methacrylate, glycerol monomethacrylate, allyl alcohol and the like. The proportion of monomers of this class in the acrylic polymer must be such that the hydroxyl number of the resulting polymer is sufficiently high to react with the isocyanate component (A).

(b) Unsaturated carboxylic acids such as acrylic acid, methacrylic acid, maleic acid, maleic anhydride, fumaric acid, crotonic acid, itaconic acid and the like.

(c) Acrylates and methacrylates of $C_1$–$C_{18}$ alkanols such as ethyl acrylate, ethyl methacrylate, n-butyl acrylate, n-butyl methacrylate, isobutyl acrylate, isobutyl methacrylate, 2-ethylhexyl acrylate, 2-ethylhexyl methacrylate, lauryl methacrylate, cyclohexyl methacrylate and the like. Monomers of this class are useful to improve the characteristics such as gloss, transparency, mechanical properties, chemical resistance, weather durability and flexibility.

(d) Alkenylarene monomers such as styrene, α-methylstyrene, chlorostyrene, vinyltoluene, p-ter.-butylstyrene and the like. These monomers are used to improve the gloss and transparency of the finished coating films.

(e) Amides such as acrylamide, methacrylamide, maleamide, N-methylacrylamide, N-butoxymethylacrylamide and the like.

(f) Glycidyl group-containing monomers such as glycidyl acrylate, glycidyl methacrylate, methylglycidyl (meth) acrylate.

(g) Other vinyl monomers such as vinyl formate, vinyl acetate, vinyl propionate, vinyl stearate, divinylbenzene, diisopropenylbenzene, allyl acetate, diallyl adipate, dimethyl itaconate, diethyl maleate, dibutyl fumarate, vinyl chloride, vinylidene chloride, ethylene and the like.

Polymerization of these monomers may be carried out in any conventional method using an initiator such as benzoyl peroxide, lauroyl peroxide, cumene hydroperoxide, di-ter.-butyl peroxide, acetyl peroxide, α,α'-azobisisobutyronitrile and the like.

Alkyd resins which may be employed for the purpose of this invention generally comprises a polycarboxylic acid, a polyol and a small amount of monocarboxylic acid such as fatty acids. Examples of polycarboxylic acid include phthalic anhydride, meleic anhydride, fumaric acid, isophthalic acid, succinic anhydride, trimellitic anhydride, adipic acid, azelaic anhydride, sebacic acid and the like. Examples of polyols include glycerol, trimethylolethane, trimethylolpropane, pentaerythritol, sorbitol, monnitol, ethylene glycol, diethylene glycol, 2,3-butylene glycol and the like.

Oil modified alkyds may comprise natural vegetable oils such as coconut oil, tung oil, linseed oil, soybean oil, fatty acids derived from these oils, long chain synthetic fatty acids and the like.

Other modified alkyds such as styrene modified, acrylate or methacrylate modified alkyds may also be used.

The preparation of alkyd resins is well-known in the art and described, for example, by D. H. Solomon, in "The Chemistry of Organic Film formers", pages 75–87, published by John Wiley & Sons (1967).

Polyester resins which may be used for the purpose of this invention are generally derived by esterifying a polyol component with a polycarboxylic component. The polyol component comprises a diol and less than 25 molar % of a polyol having three or more hydroxyl groups. Examples of usable diols include ethylene glycol, propylene glycol, butylene glycol, neopentyl glycol, hydrogenated bisphenol A, cyclohexanedimethanol, caprolactone diol (e.g. prepared by reacting caprolactone with ethylene glycol), hydroxyalkylated bisphenol, polyether glycols such as poly(oxytetramethylene)glycol and the like. Examples of polyols having three or more hydroxyl group include trimethylolethane, trimethylolpropane, pentaerythritol, adduct of 1 mole of trimethylolpropane with 20 moles of ethylene oxide, adduct of 1 mole of hexanetriol with 6 moles of ε-caprolactone and the like.

The polycarboxylic acid component comprises at least 75 molar % of dicarboxylic acids such as phthalic acid, isophthalic acid, terephthalic acid, tetrahydrophthalic acid, hexahydrophthalic acid, adipic acid, azelaic acid, sebacic acid, glutaric acid, chlorendic acid, tetrachlorophthalic acid and anhydrides of these acids. The acid component may comprise a small amount of a monocarboxylic acid such as benzoic acid and a tricarboxylic acid such as trimellitic anhydride and tricarballylic acid. The acid component preferably comprises an aliphatic dicarboxylic acid as a part thereof.

The term "polyester" used herein includes a polyester amide which may be prepared by replacing a diamine or amino alcohol for a minor portion of the above-described polyol component. Examples of usable diamines and amino alcohols include hexamethylenediamine, ethylenediamine, phenylenediamine, tolylenediamine, 2,2,2-tris(hydroxymethyl)-1-ethylamine, monoethanolamine and the like.

The polyester resins may be prepared from the above-described components in any conventional method. The proportions of various components are selected such that the resulting polyester retains free hydroxyl groups corresponding to a hydroxyl number of at least about 20, preferably at least about 40.

Epoxy group-containing resins which may be used in the present invention include a condensate between epichlorhydrine and bisphenol A, other epoxy resins such as novolak type epoxy resins, brominated epoxy resins, oxirane ring-containing epoxy resins, glycidyl ether resins, glycidyl ester resins, polyglycol ether resins, glycol ether resins, epoxylated unsaturated aliphatic compounds, epoxylated polybutadiene, acrylic resins containing glycidyl acrylate or glycidyl methacrylate and the like.

Amino group-containing resins which may be used in the present invention include melamine resins, urea resins, guanamine resins and the like. Copolymers containing acrylamide or methacrylamide monomer may also be used.

The advantages of the lacquer type coating compositions according to the present invention may be summarized as follows:

1. They are less viscous than conventional lacquer compositions when compared at the same nonvolatile content. Accordingly, the nonvolatile content may be increased higher than that of conventional lacquers while keeping the viscosity at an acceptable level. For example, when the viscosity is adjusted at 12 second according to Ford Cup #4, the nonvolatile content of the clear lacquer compositions of the present invention ranges from 20 to 25% while the corresponding value of conventional lacquers ranges from 15 to 20%.

2. Deposition efficiency may be increased upon spray coating by about 50% compared with conventional laquer compositions at the same pumping rate.

3. Improved appearance and brilliancy are obtained.

4. Finger-touch drying time may be decreased because of improved solvent evaporation.

5. There is no limitation due to the mutual solubility between cellulose derivatives and resins which permits a variety of resins to combine with the cellulose derivatives.

6. Weather durability is improved.

The following examples will further illustrate the present invention. All parts and percentages in the examples are by weight unless otherwise specified.

EXAMPLE 1

Cellulose nitrate H ¼ (clear chips)—20 parts
Xylene—20 parts
Butyl acetate—40 parts
Cellosolve acetate—20 parts 100 parts of a cellulose nitrate solution of the above formulation were placed in a one liter flask provided with stirring means, a reflux condenser, a thermometer and nitrogen gas-introducing means. To the flask were added 0.3 parts of isophorone diisocyanate and 0.03 parts of dibutyltin dilaurate. The ratio of $A_{NCO}/A_{CH}$ of the mixture was determined to be 0.8.

Then the mixture was stirred at 80° C. for 4 hours. The ratio of $A_{NCO}/A_{CH}$ was determined to be 0.4 at the end of reaction.

The first reaction stage was terminated at this moment and then 134 parts of ACRYDIC A-801 (Dainippon Inc And Chemicals, Inc.) were added to the mixture. The ratio of $A_{NCO}/A_{CH}$ was 0.04. The mixture was heated at 80° C. with stirring for 4 hours to complete the second stage. The absorbance ratio of $A_{NCO}/A_{CH}$ was 0.001 at this moment. A brownish clear solution was obtained. This solution was applied on a glass plate using a 4 mil thick applicator whereupon a transparent film was formed.

EXAMPLE 2

The procedure of Example 1 was repeated except that the amounts of isophorone diisocyanate and dibutyltin dilaurate were increased to 1.0 part and 0.1 parts, respectively.

A brownish clear solution was obtained.

EXAMPLE 3

The procedure of Example 1 was repeated except that the amounts of isophorone diisocyanate and dibutyltin dilaurate were decreased to 0.05 parts and 0.005 parts, respectively.

EXAMPLE 4

0.5 parts of methacrylic acid, 9 parts of 2-hydroxyethyl methacrylate, 30.5 parts of n-butyl acrylate and 60 parts of methyl methacrylate were copolymerized by the conventional method to give an acrylic varnish having a solid content of 50% in 1:1 mixture of toluene and butyl acetate and a Gardner-Holtz viscosity of U-W at 25° C. This varnish is referred to as "Acrylic Varnish A."

100 parts of the cellulose nitrate solution prepared in Example 1 were reacted with 0.3 parts of isophorone diisocyanate in the presence of 0.03 parts of dibutyltin dilaurate as in the first reaction stage of Example 1.

To the reaction mixture were added 134 parts of Acrylic Varnish A. The absorbance ratio of $A_{NCO}/A_{CH}$ was determined to be 0.04 at this moment. Then the mixture was heated at 80° C. with stirring for 4 hours to complete the second reaction stage. The absorbance ratio of $A_{NCO}/A_{CH}$ was determined to be 0.001 at the end of reaction.

The resulting brownish clear solution was applied on a glass plate using a 4 mil thick applicator whereupon a transparent film was obtained.

EXAMPLE 5

9.2 parts of 2-hydroxyethyl methacrylate, 0.8 parts of methacrylic acid, 20 parts of styrene, 20 parts of n-butyl acrylate, 20 parts of n-butyl methacrylate and 30 parts of isobutyl methacrylate were copolymerized by the conventional method to give an acrylic varnish having a solid content of 60% in 1:1 mixture of toluene and butyl acetate and a Gardner-Holtz viscosity of V-X at 25° C. This acrylic varnish is referred to a "Acrylic Varnish B."

CAB-551-0.2 (Eastman Kodak)—20 parts
Toluene—60 parts
Ethyl acetate—20 parts 100 parts of cellulose acetate butyrate solution of the above formulation were reacted with 0.2 parts of isophorone diisocyanate in the presence of 0.02 parts of dibutyltin dilaurate as in the first reaction stage of Example 1.

To the mixture were reacted 134 parts of Acrylic Varnish B as in the second stage of Example 1 to give a colorless transparent solution. This solution was applied on a glass plate using a 4 mil thick applicator whereupon a transparent film was obtained.

EXAMPLE 6

The first reaction stage of Example 1 was repeated. To the reaction mixture were added 134 parts of DESMOPHEN 1100 (Bayer). The absorbance ratio was determined to be 0.12 at this moment. The mixture was heated at 80° C. with stirring for 4 hours. The absorbance ratio was decreased to 0.001 at the end of the second reaction stage.

EXAMPLE 7

The first reaction stage of Example 1 was repeated. To the reaction mixture were added 135 parts of an epoxy resin solution of the following formulation:
EPIKOTE 1001 (Shell Chemical)—50 parts
Xylene—20 parts
Cellosolve acetate—30 parts The absorbance ratio was determined to be 0.11 at this moment. Then the mixture was heated at 80° C. with stirring for 4 hours. The absorbance ratio was decreased to 0.001 at the end of reaction. A brownish clear solution was obtained.

EXAMPLE 8

The first reaction stage of Example 1 was repeated. To the reaction mixture were added 135 parts of melamine resin (SUPER BECKAMINE G-821, Dainippon Ink And Chemicals, Inc.). The absorbance ratio was 0.06 at this moment. Then the mixture was heated at 80° C. with stirring for 4 hours. The absorbance ratio was 0.001 at the end of reaction.

COMPARATIVE EXAMPLE 1

100 parts of cellulose nitrate solution used in Example 1 were simply mixed with 134 parts of ACRYDIC A-801. A brownish clear solution was obtained. This solution was applied on a glass plate using a 4 mil thick applicator whereupon a transparent film was obtained.

COMPARATIVE EXAMPLE 2

100 parts of CAB solution prepared in Example 5 were simply mixed with 134 parts of Varnish B. A turbid mixture was obtained. This mixture was applied on a glass plate using a 4 mil thick applicator whereupon a turbid film was obtained.

Coating compositions were prepared from the resins prepared in the foregoing examples and tested their properties.

A clear coating composition was prepared by diluting each resin solution with a thinner consisting of 20 parts of ethyl acetate, 40 parts of toluene, 30 parts of xylene and 10 parts of butyl cellosolve to a Ford Cup #4 viscosity of 12 to 14 seconds.

A white enamel was prepared by mixing each resin solution with rutile type titanium dioxide and toluene in a proportion as shown in Table 1, and then diluting with the above thinner to a Ford Cup #4 viscosity of 10 to 12 seconds.

The coating composition was applied by spraying onto a steel panel of 0.8 mm thick which was previously given a lacquer primer surfacer, and dried either at room temperature for 7 days or at 80° C. for 20 minutes (substantially no difference in the characteristics of the resulting film due to the difference of these drying conditions).

The film thickness was adjusted such that the primer was about 40μ thick and the coating composition of this invention was about 50 to 60μ thick after drying.

Drying time was determined by measuring the length of drying time at 20° C. according to JIS K5400 5.8.

Gloss value was determined by the reflection coefficient at a reflection angle of 60° according to JIS K5400 6.7.

Hardness and adherance were tested according to JIS K5400 6.14 and JIS K5400 6.15, respectively.

Appearance was evaluated visually by noting the presence and size of paper-like pattern, orange peel pattern etc.

Anti-UV property was tested by irradiating the test panel with UV light from two UV light sources (15 W) both spaced from the test panel at a distance of 30 cm for 100 hours. Thereafter, change in appearance (chalking, yellow coloration etc.,) was noted, and the values of 60° gloss and color difference were determined by a 60° gloss meter and a digital color difference meter (Suga Test Instruments), respectively.

The formulations and film properties of the coating compositions tested are shown in Table 1 below.

TABLE 1

| Example No. | Ex. 1 | | Ex. 2 | | Ex. 3 | | Ex. 4 | | Ex. 5 | | Ex. 6 | | Comp. 1 | | Comp. 2 | |
|---|---|---|---|---|---|---|---|---|---|---|---|---|---|---|---|---|
| Formulation | | | | | | | | | | | | | | | | |
| Resin solution, parts | 100 | 70 | 100 | 70 | 100 | 70 | 100 | 70 | 100 | 60 | 100 | 60 | 100 | 70 | 100 | 60 |
| Titanium dioxide, parts | — | 16 | — | 16 | — | 16 | — | 16 | — | 16 | — | 16 | — | 16 | — | 16 |
| Toluene, parts | — | 14 | — | 14 | — | 14 | — | 14 | — | 24 | — | 24 | — | 14 | — | 24 |
| Cellulose nitrate/acrylic (on dry basis) | | | 1/3.4 | | | | | | | | | | 1/3.4 | | | |
| CAB/acrylic (on dry basis) | | | — | | | | 1/3.9 | | | | — | | — | | 1/3.9 | |
| Cellulose nitrate/alkyd (on dry basis) | | | — | | | | — | | | | 1/3.9 | | — | | — | |
| Properties of coated film | | | | | | | | | | | | | | | | |
| Drying time (cure), hour | 2 | 1 | 4 | 3 | 5 | 4 | 2 | 1 | 2 | 1 | 3 | 2 | 5 | 4 | 2 | 1 |

TABLE 1-continued

| Example No. | Ex. 1 | | Ex. 2 | | Ex. 3 | | Ex. 4 | | Ex. 5 | | Ex. 6 | | Comp. 1 | | Comp. 2 | |
|---|---|---|---|---|---|---|---|---|---|---|---|---|---|---|---|---|
| Gloss | 94.3 | 89.5 | 90.2 | 82.5 | 90.7 | 82.9 | 87.8 | 96.9 | 93.5 | 90.2 | 91.0 | 97.1 | 90.5 | 83.0 | 71.5 | 52.1 |
| Pencil hardness | F | F | F | F | F | F | F | F | F | F | F | F | F | F | F | F |
| Adherence | O | O | O | O | O | O | O | O | O | O | O | O | O | O | ⓐ | ⓐ |
| Appearance | O | O | ⓐ | ⓐ | Δ | Δ | O | O | O | O | O | O | Δ | Δ | Δ | X |
| UV exposure test | | | | | | | | | | | | | | | | |
| Appearance | O | ⓐ*1 | O | ⓐ | Δ*2 | Δ | O | O | O | O | O | ⓐ | Δ | Δ | O | O |
| Gloss | 92.2 | 88.7 | 90.2 | 80.4 | 89.5 | 81.7 | 87.0 | 96.0 | 92.1 | 89.9 | 90.5 | 96.8 | 89.0 | 81.2 | 65.3 | 50.2 |
| Color difference | 1.6 | 2.1 | 1.4 | 2.0 | 3.1 | 2.9 | 1.5 | 1.7 | 0.5 | 0.5 | 1.8 | 2.5 | 3.3 | 3.3 | 0.9 | 0.9 |

Symbols in the table are as follows:
O: Very good
ⓐ: Good
Δ: Fair
X: Poor
*1 Slight yellow coloration
*2 Yellow coloration The above has been offered for illustrative purposes only, and it is not for the purpose of limiting the scope of this invention which is defined in the claims below.

We claim:

1. A cross-linked hybrid polymer comprising a first polymer block and a second polymer block cross-linked to each other via bonds to different reaction sites of a polyisocyanate compound, the bond of the first polymer block with the polyisocyanate compound being effected prior to the bond of the second polymer block thereto, said first polymer block being a film-forming cellulose derivative having at least one active hydrogen atom reactive with an isocyanato group of said polyisocyanate but not reactive with at least one remaining isocyanato group of said polyisocyanate, and said second polymer block being a preformed film-forming polymer having at least one active hydrogen atom which is reactive with said remaining isocyanato group of the polyisocyanate with which said active hydrogen atom of the cellulose derivative was unreactive, and said second film-forming polymer being an acrylic resin, an alkyd resin, a polyester resin, an epoxy resin, an aminoplast resin or a mixture of these resins; the ratio of the active hydrogen equivalent of said cellulose derivative to the isocyanate equivalent of said polyisocyanate being 1.0 to 200, and the ratio of the isocyanate equivalent of said polyisocyanate to the active hydrogen equivalent of said film-forming polymer being less than 1.0.

2. The polymer of claim 1, wherein said cellulose derivative is cellulose nitrate, cellulose acetate, cellulose acetate butyrate or ethyl cellulose.

3. The polymer of claim 2, wherein said polyisocyanate compound has at least two isocyanato groups having different reactivities.

4. The polymer of claim 3, wherein said polyisocyanate compound is isophorone diisocyanate or lysine alkyl ester diisocyanate.

5. The polymer of claim 4, wherein said cellulose derivative is cellulose nitrate and said film-forming polymer is an acrylic resin.

6. The polymer of claim 4, wherein said cellulose derivative is cellulose nitrate and said film-forming polymer is an alkyd resin.

7. The polymer of claim 4, wherein said cellulose derivative is cellulose acetate butyrate and said film-forming polymer is an acrylic resin.

8. A hybrid polymer of claim 1 wherein the ratio of the active hydrogen equivalent of said cellulose derivative to the isocyanate equivalent of said polyisocyanate is 50-100.

9. A hybrid polymer of claim 1 wherein the ratio of the isocyanate equivalent of said polyisocyanate to the active hydrogen equivalent of said film-forming polymer is less than 0.2.

10. A hybrid polymer of claim 1 wherein the ratio of the active hydrogen equivalent of said cellulose derivative to the isocyanate equivalent of said polyisocyanate is greater than 1.

11. A hybrid polymer of claim 1 wherein, in the reaction of said first polymer block with the polyisocyanate, the absorbance of $A_{NCO}$ at 2240 cm$^{-1}$ to the absorbance $A_{CH}$ at 2960 cm$^{-1}$ of the reaction mixture falls to 20 to 80% of that of the initial value of the ratio.

12. A method for preparing a cross-linked hybrid polymer which comprises reacting a polyisocyanate compound, in a first reaction stage, with a film-forming cellulose derivative having at least one active hydrogen atom reactive with an isocyanato group of said polyisocyanate but not reactive with at least one remaining isocyanato group of said polyisocyanate, and then, in a second reaction stage, reacting the product with a film-forming polymer having at least one active hydrogen atom which is reactive with said remaining isocyanato group of the polyisocyanate with which said active hydrogen atom of the cellulose derivative was unreactive, and said second film-forming polymer being an acrylic resin, an alkyd resin, a polyester resin, an epoxy resin, an aminoplast resin or a mixture of these resins; the ratio of the active hydrogen equivalent of said cellulose derivative to the isocyanate equivalent of said polyisocyanate being 1.0 to 200; and the ratio of the isocyanate equivalent of said polyisocyanate to the active hydrogen equivalent of said film-forming polymer being less than 1.0.

13. The method according to claim 12, wherein said cellulose derivative is cellulose nitrate, cellulose acetate, cellulose acetate butyrate or ethyl cellulose.

14. The method according to claim 13, wherein said polyisocyanate compound has at least two isocyanato groups having different reactivities.

15. The method according to claim 14, wherein said polyisocyanate compound is isophorone diisocyanate or lysine alkyl ester diisocyanate.

16. The method according to claim 12, wherein a catalyst is present in the reaction system.

17. The method according to claim 16, wherein said catalyst is an organometallic compound or a tertiary amine.

18. The method according to claim 12, wherein said first stage reaction is continued until the ratio of the absorbance of $A_{NCO}$ at 2240 cm$^{-1}$ to the absorbance $A_{CH}$ at 2960 cm$^{-1}$ of the reaction mixture falls to 20 to 80% of that of the initial value of the ratio.

19. A method of claim 12 wherein the ratio of the active hydrogen equivalent of said cellulose derivative to the isocyanate equivalent of said polyisocyanate is 50–100.

20. A method of claim 12 wherein the ratio of the isocyanate equivalent of said polyisocyanate to the active hydrogen equivalent of said film-forming polymer is less than 0.2.

21. A hybrid polymer of claim 8 wherein the ratio of the isocyanate equivalent of said polyisocyanate to the active hydrogen equivalent of said film-forming polymer is less than 0.2.

22. A method of claim 19 wherein the ratio of the isocyanate equivalent of said polyisocyanate to the active hydrogen equivalent of said film-forming polymer is less than 0.2.

23. A method of claim 12 wherein the ratio of the active hydrogen equivalent of said cellulose derivative to the isocyanate equivalent of said polyisocyanate is greater than 1.

* * * * *